INVENTOR.
LAWRENCE CHRISTIE PORTER
BY
EUGENE O. RETTER
GEORGE T. JOHANNESEN
ATTORNEYS

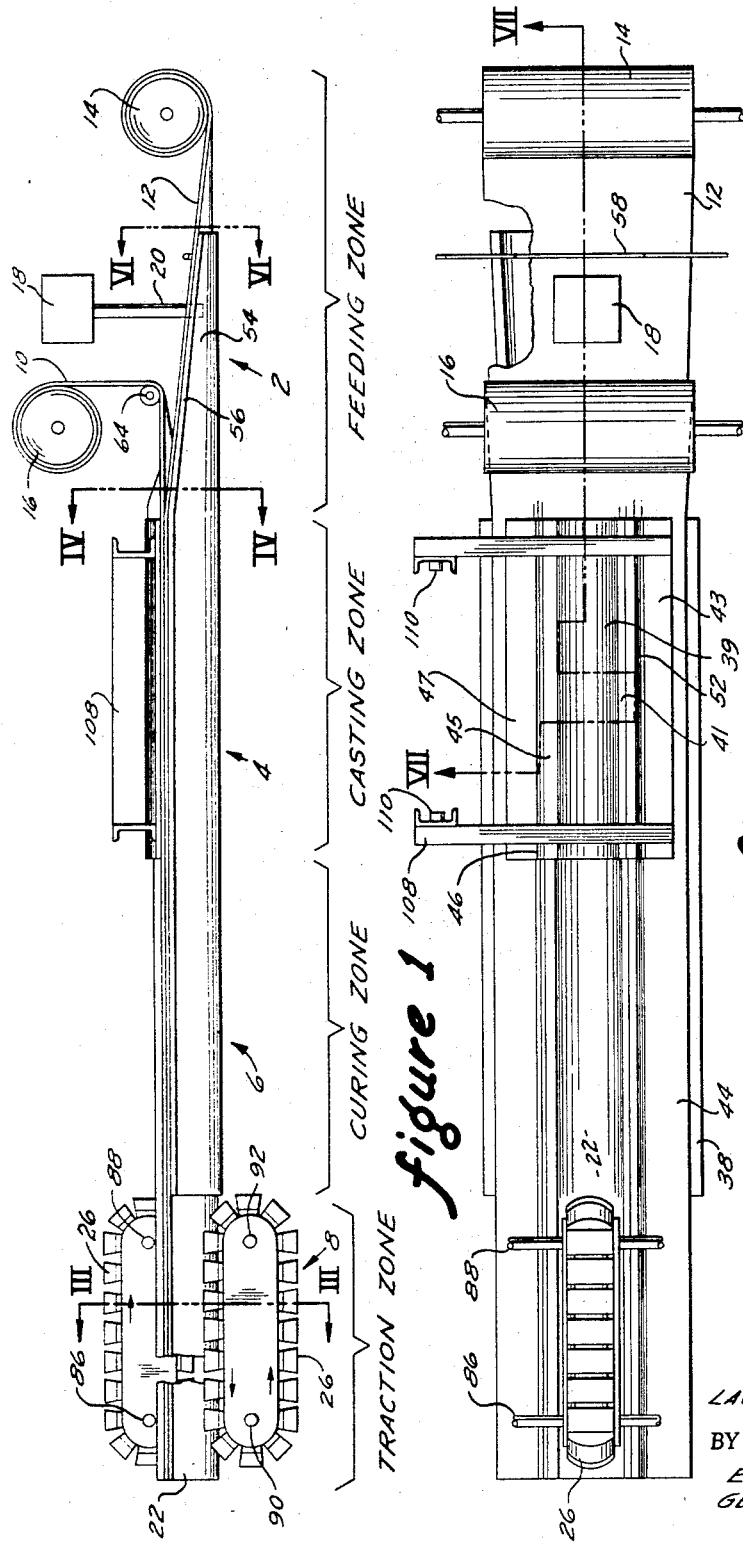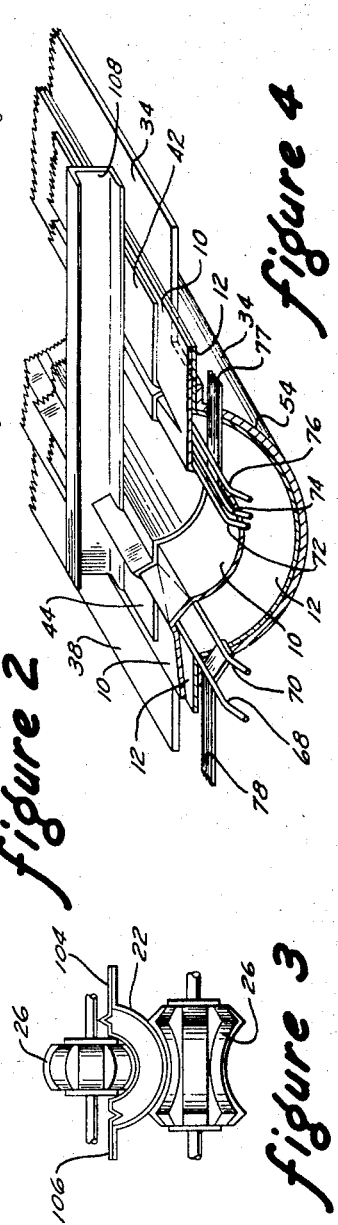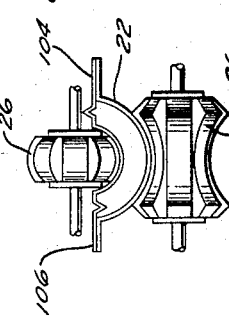

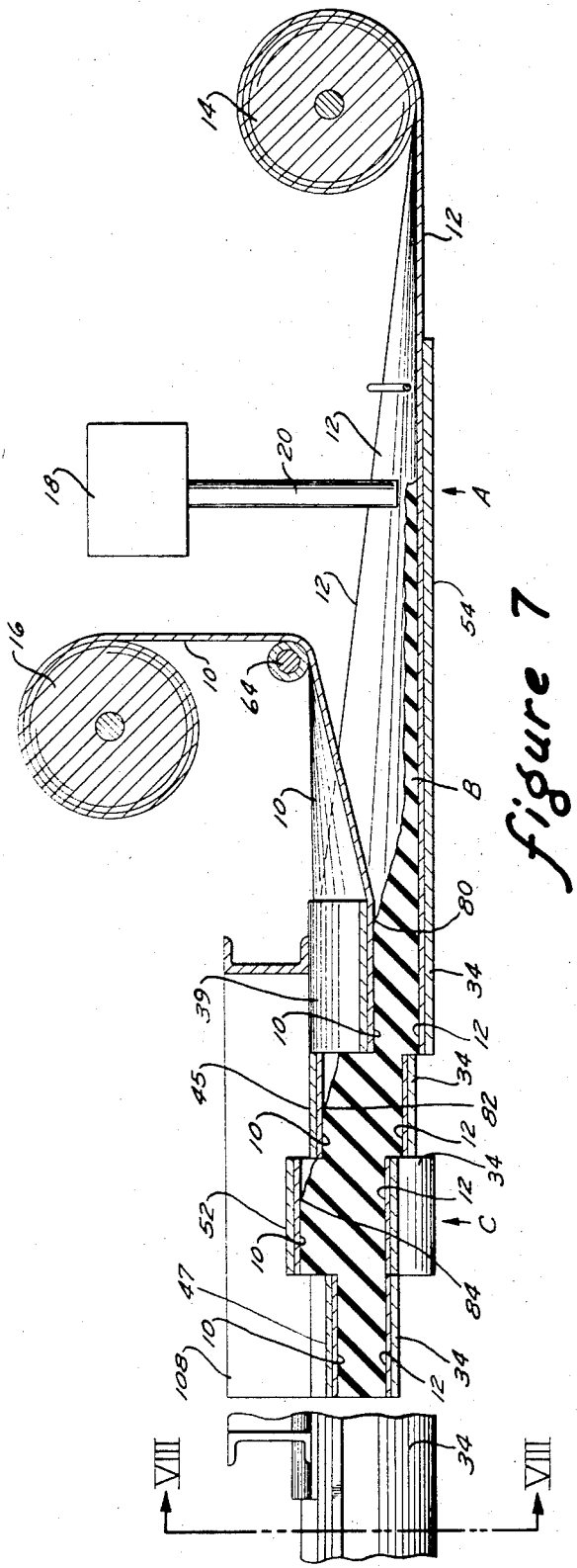

United States Patent Office 3,429,956
Patented Feb. 25, 1969

3,429,956
METHOD AND APPARATUS FOR CONTINUOUSLY CASTING ELONGATED FOAM-CORED LAMINATES
Lawrence Christie Porter, Palos Verdes Peninsula, Calif., assignor to The Upjohn Company, Kalamazoo, Mich., a corporation of Delaware
Filed Sept. 14, 1964, Ser. No. 396,018
U.S. Cl. 264—47  5 Claims
Int. Cl. B29d 9/00

ABSTRACT OF THE DISCLOSURE

Elongated foam-cored laminates are cast in a horizontally disposed, tubular mold lined with paper or like flexible substantially non-stretchable sheet material. A foam-forming liquid, which in the process of foaming rises to a self-supporting cellular structure, is deposited on the sheet material and allowed to rise to fill the mold. The sheet material, which is initially flat as it comes off rolls, is distorted to conform it to the inner surfaces of the mold and is pulled through the mold by tractor elements engaging opposite sides of the foam-cored laminate at a rate to keep the rise front within the mold.

---

It has been proposed heretofore (U.S. Patent 2,956,310) to produce continuously thin sheets of foam or foam-cored laminates by spreading a uniformly thin coating of foam-producing liquid on a continuously moving casting sheet, laying a cover sheet on the liquid film, and causing the liquid to foam between the two sheets, and, if desired, shaping the cover sheet, or shaping the foam product before it finally sets up, to provide desired contours in the foamed sheet. This process has the disadvantages that the free rise tends to produce sheets of non-uniform thickness, that the foam does not effectively rise to fill irregularities in a contoured cover sheet, that a contoured cover sheet, unless non-resilient, can be maintained in its contoured shape only with difficulty, and that shaping or contouring of the formed foam sheet, even when done before the foam sets up, cannot be effected without distortion of the cell structure. Furthermore, the method is unsuitable for producing foam-cored laminates where the casting sheet is permanently laminated to the foam sheet because no means is provided whereby the cover and/or casting sheets can be continuously pulled through the casting zone without stripping it afterwards from the foamed sheet.

It has been proposed to overcome these difficulties by causing a film to rise within a mold, wherein the rise is limited and a sheet of uniform thickness is obtained. However, in these procedures continuous belts are used to form the mold and to move the casting and cover sheets and the resulting foam-cored laminate through the mold. See, for example, U.S. Patent 3,123,856 and P. Hoppe, Baukonstruktionen unter Verwendung harter Shaumstoffe, Kunststoffe, 53, 766–777 (October 1963). Such methods have the disadvantage of requiring endless belts in the forming zone for moving the foam-cored laminate therethrough and are particularly disadvantageous in this respect when foam-cored laminates of irregular shape are desired.

BRIEF SUMMARY OF THE INVENTION

It has now been found that the disadvantages of the prior art are voided and new and unexpected advantages are obtained by continuously pulling flexible substantially non-stretchable sheet material longitudinally through and along the bottom sides, and top of an open-ended elongated tubular mold having a cross section substantially uniform throughout the length thereof, conforming the sheet material to the inner surface of said mold, introducing a foam-forming liquid so that it is carried by the sheet material into said mold where it rises to fill the mold, contacting said sheet material while part of the laminate between opposed traction surfaces so arranged and so moving as to provide a pulling force required to pull the sheet material through the mold at a rate to maintain the rise front stationary, the traction surfaces being so arranged and having sufficient area in contact with the sheet material that the necessary traction is generated without deleteriously affecting cellular structure of the laminate.

BRIEF DESCRIPTION OF THE DRAWINGS

The invention may be more fully understood by reference to the accompanying drawings in which:

FIGURE 1 is a side elevation of the apparatus of the invention showing the foam-core laminate produced therein;
FIGURE 2 is a plan view of FIGURE 1;
FIGURE 3 is a cross section taken on line III—III of FIGURE 1;
FIGURE 4 is an isometric cross section taken on line IV—IV of FIGURE 1 showing the laminating sheets but not the foam core;
FIGURE 5 is a detail view of parts of FIGURE 4;
FIGURE 7 is a sectional view taken along line VII—VII of FIGURE 2.

DETAILED DESCRIPTION

Figure 6:
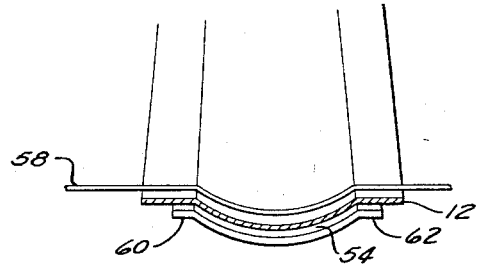
FIGURE 6 is a detail view of parts shown in FIGURE 2 taken along line VI—VI of FIGURE 1.

As shown more particularly in FIGURE 1, the apparatus of the invention comprises four zones; namely, a feeding zone 2, a casting zone 4, a curing zone 6, and a traction zone 8. Sheet material 10 and 12 from rolls 14 and 16 is fed through the feeding zone 2 into the casting zone 4, and conformed to the bottom, side, and top walls of the casting zone 4, foam-forming liquid is fed from the mixer 18 through nozzle 20 onto sheet 12 after which it is caused to rise to meet sheet 10 in the casting zone 4 and to form a foam-cored laminate structure 22 which then passes out through the curing zone 6 and into the traction zone 8 where the top and bottom surfaces are engaged by the tractor elements 26 as more particularly shown in FIGURE 3. The tractor elements 26 in contact with the sheet material 10 and 12 provide the pulling force necessary to pull the composite material through the casting zone 4. By proper selection of the number of traction elements 26 in contact with the sheet material selected according to the coefficient of friction between the traction members 26 and the sheet material 10 and 11, the necessary pulling force can be obtained without deleteriously compressing the foam core. If the foam is rigid and strong, the number of traction elements 26 can be small. If the foam is weak or soft, the number must be increased. In some cases, however, as in the case of flexible foam when it is desirable to crush the cell structure, the number of traction elements 26 need not be any larger than that which will crush the foam at the pressures necessary to obtain the desired pulling force.

Figure 8:
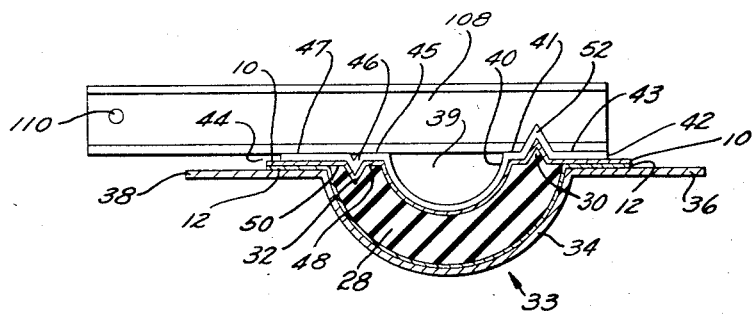
FIGURE 8 is a cross section taken along line VIII—VIII of FIGURE 7.
Figure 9:
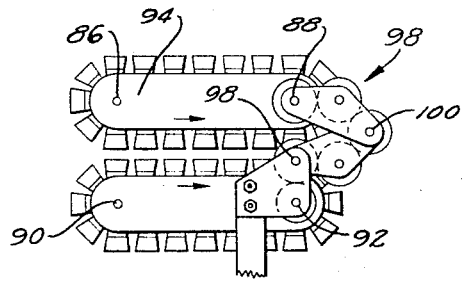
FIGURE 9 is a detail view of the tractor elements shown in FIGURES 1, 2, and 3.

An important feature of the invention is the adaptability of the process and apparatus to producing irregular shaped foam-cored laminates. A typical cross section of such an irregular foam-cored laminate is shown in FIGURE 8 where 28 represents the foam core and 10 and 12 the top and bottom sheets, respectively, of the laminate. The foam core 28 has a segmental cross sectional shape provided with complementary tongue and groove fitments 30 and 32, respectively. The tongue and groove fitments 30 and 32 are complementary in that when two of the segmental sections 28 are put together, the tongue 30 of one fits into the groove 32 of the other. The segment may be any aliquot part of a circle, for example, 180° as shown in FIGURE 8, 120°, 90°, or the like, so that when the segments are put together in the proper number, they combine to form a composite tube of annular cross section such as are used, for example, for lagging pipes.

The casting zone 4 comprises an elongated tubular mold of subtsantially uniform cross section throughout its length. In the form shown, the mold is composed of top and bottom sections 33 and 39, respectively. The bottom section 33 is formed as a semi-circular channel 34 having flat horizontal shoulders 36 and 38 extending outwardly from the upper edges thereof. The top portion 39 is formed as a complementary semi-circular channel 40 concentric with the semi-circular channel 34 and is provided with horizontal shoulders 42 and 44 extending outwardly from the upper edges thereof over the shoulders 36 and 38. One of the shoulders 44 is provided with a downwardly extending V-shaped longitudinal rib 46 dividing the shoulder 44 into an inner panel 45 and an outer panel 47. The panel 45, rib 46, and member 40 form a longitudinal channel 48 and the panel 47, rib 46, and member 34 form another longitudinal channel 50. These channels and rib 46 cooperate to form the groove fitment 32 in the product. The other shoulder 42 has a longitudinally extending channel 52 of complementary shape to the longitudinally extending rib 46 which divides the shoulder 42 into inner and outer panels 41 and 43, respectively. This provides the tongue fitment 30 which complements the groove fitment 32.

It will be observed that the top sheet 10 and the bottom sheet 12 extend between the shoulders 36 and 42 on the one side and between the shoulders 38 and 44 on the other side and that in between the sheets, are conformed to the inner surfaces of mold. The top sheet follows the underside of panel 47 to rib 46, down one side and up the other side of rib 46, continues along panel 45 to member 40, then down and around member 40 to panel 41, across to and up into and along one side of channel 52 and down again and along the other side, and then across panel 43. Sheet 12 extends along the top side of shoulder 38, then down along the inner surface of member 34 and up to the opposite shoulder 36, and then along the shoulder 36. Sheets 10 and 12 thus are in surface contact with all the parts of the mold. This is accomplished by providing means for conforming the bottom sheet to the shape of the bottom half of the mold and the top sheet to the shape of the top half of the mold. The former is accomplished in this manner. The sheet 12 feeds into a slightly funnel shaped member 54 having sides 56 which slope inwardly and upwardly to the bottom portion 33 of the mold where it merges with and becomes a unitary part of the bottom section 33 of the mold. The sheet material 12 passes from the roll 14 under a member 58 made of wire or block material having its bottom surface conformed to the shape of the member 54, as more particularly shown in FIGURE 6. The sheet material 12 rides over the sides 56 which may, if desired, be provided with outward extending shoulders 60 and 62 which are smaller than shoulders 36 and 38, respectively, but are unitary therewith. The sheet material 12 then enters into the casting zone 4 in contact with all parts of the channel shaped portion 34 and with portions extending outwardly on shoulders 36 and 38 as shown in FIGURE 8. In the form shown where the bottom section has a regular shape, it is not necessary that close contact be maintained initially because the foam-forming liquid is deposited on this sheet and the rising of the foam in the mold will tend to conform sheet 12 to the regular shape of the section 34. It is important, however, that close contact be maintained if the surface contacted by the sheet, as for example, in the case of the top section 39, is irregular.

The top sheet 10 is fed from roll 16 under roll 64 into the mold between the shoulders 36 and 42 on one side and the shoulders 38 and 44 on the other. In order to obtain the complementary tongue and groove fitments 30 and 32, it is necessary, as noted above, to maintain close contact between sheet 10 and the entire inner surface of top section 39 of the mold. This is accomplished in the form shown by providing means to cause the sheet 10 to conform to the shape of the upper portion of mold 18 before the foam comes in contact therewith. The rising foam dots not have force enough to make the sheet conform to irregularities such as are embodied in the top section 39. This is accomplished, as shown more particularly in FIGURES 4 and 5, by providing a set of fingers 66 extending from the exterior of the mold to the interior thereof and arranged as necessary to force the sheet material 10 into each of the angles formed by the longitudinal rib 46 and the longitudinal channel 52. Thus, two fingers 68 and 70, supported by bar 71 mounted in the frame (not shown), are provided to force the sheet material 10 up into the apex of the channel 52 and into the corner formed by the junction of panel 41 and member 40, and three fingers 72, 74, and 76 mounted on bar 77 also mounted on the frame are provided to force the sheet material 10 into the angles on each side of the longitudinal rib 46 and the one formed by the junction of panel 45 with member 40. The bars 71 and 77 are so disposed that sheet 12 rides under them just prior to its entry into the mold. Any other suitable means can be used to conform the paper to the shape of the top section 39, for example, a complementary shaped bar conforming to the shape of the top section 39 and disposed to feed the paper between it and the top section 39. Also, the top section 39 can, if desired, be made perforate and provided with a suction head whereby the sheet 10 is placed under negative pressure and forced to conform to the top section 39 by the ambient pressure of the atmosphere. However it is accomplished, it is important to the successful operation of the method of the invention that the sheet material be conformed with all irregularities in the mold before the foam rises to fill the mold. Otherwise, the desired irregularities in the foam-cored laminate, for example, the complementary tongue and groove fitments 30 and 32, will not be obtained, at least not without imperfections.

The bottom portion 33 of the mold, in the form shown in the drawings, is extended through the curing zone 6. This provides support for the foam-cored laminate while it is being cured to provide the resistance to compression necessary according to the design and number of the tractors 26 to enable them to generate the necessary tractive force to pull the foam-cored laminate and, in turn, the sheets 10 and 12 and the foam-forming liquid through the mold. As shown in the drawing, the curing zone 6 is open to the ambient temperature. This modification is suitable for continuous casting of those polyurethane foams which rapidly cure at ambient temperatures, but it is to be understood that the curing zone may be extended as necessary, or provided with heating elements as necessary, to effect the desired curing according to the particular characteristics of the material used for forming the foam core.

The rate at which the foam-cored laminate is extracted from the mold by the tractor elements 26 and the foaming characteristics of the foam-forming liquid are correlated to maintain the rise front within the mold. How this is best accomplished is shown in FIGURE 7 which is a section taken along section lines VII—VII of FIGURE 2. The components of the foam-forming liquid are mixed in the foam mixer 20 and deposited on the bottom sheet 12 through nozzle 22. The rate of flow is adjusted as necessary to give a rise which completely fills the mold. The foam-forming liquid moves along with the sheet from point A to point B which represents the induction period during which the foam-forming material starts to cream just prior to its beginning to rise. The foam then begins to rise at point B and continues to rise until point C is reached at which time the foam fills the entire cross section of the mold. The first part of the section shows the foam-forming liquid carried by sheet 12 and how it starts to rise at point B and makes first contact with sheet 10 at the bottom of member 40 at 80 just inside the front end of the mold. The next two sections show the rise continuing to fill channels 48 and 50 at 82, and channel 52 at 84, thus filling all of the mold including the irregularities, i.e., channels 48, 50, and 52, of the top section 39. It is to be understood, of course, that FIGURE 7 is merely illustrative and that the rise can be shorter or longer according to the characteristics of the foam-forming liquid used. The induction period A and B may be accomplished in various ways. Thus, by suitably adjusting the composition of the foam-forming material the mere lapse of the time A–B at ambient temperatures will be sufficient to initiate the rise. Alternatively, the initiation of the rise can be accelerated by heating or decelerated by cooling. The important thing is to adjust the composition or conditions in accordance with techniques already known to those skilled in the art to initiate the rise at a point at which the rise will take place in the mold. It will be understood, of course, that the rise can be initiated outside of the mold as long as the foam rises to meet the upper portions of the mold, for example, as shown in FIGURE 7.

The sheet material 10 and 12 must be flexible so they can conform with the shape of the mold but must be substantially non-stretchable. Suitable material includes calendered paper, for example, calendered kraft paper sheets, paper-backed foil, glassine, or metal foil by itself. In short any material sufficiently flexible to be conformed to the shape of the mold and sufficiently non-stretchable that the laminate can be extracted from the mold by the tractor elements 26 can be used. If it is desired to separate the sheet material or part of it from the finished laminate, the sheet material can be coated with anti-sticking compound such as silicone lubricants, polyethylene, or wax. Polyethylene-backed paper can advantageously be used.

It is possible also to form laminates with non-strippable material, even through objectionably stretchable, by interposing sheets of such material between the foam-forming liquid or foam resulting therefrom and the non-stretchable sheet material 10 and 12. Suitable materials for this purpose include regenerated cellulose, cellulose nitrate, cellulose acetate, cellulose acetate butyrate, ethyl cellulose, vinyl chloride-vinyl acetate copolymer, polyvinyl butyral, polystyrene, modified styrene polymers, rubber hydrochloride, polyamides, (nylon), polyesters (polyethylene terephthalate), and vinyl chloride vinylidene chloride copolymers. Porous fibrous sheets, for example, cloth or netting can be similarly used.

The method of the invention is particularly useful in preparing foam-cored laminates with polyurethane foams. The production of such polyurethane foams from polyols and polyisocyanates is well known in the art, for example, U.S. Patents 3,036,022; 3,037,946; 3,039,976; 3,050,477; 3,053,778; 3,060,137; 3,061,556; 3,072,582; 3,073,788; 3,075,926; 3,075,928; 3,080,329; 3,085,983; 3,087,901; U.S. Reissue, 25,514; Dombrow, "Polyurethanes," Reinhold Publishing Corp., New York, pp. 1–105 (1957); Saunders et al., "Polyurethanes," Part I, Interscience Publishers, New York (1962). By choosing suitable polyisocyanates and suitable polyols according to the teachings of prior art, soft and flexible, semi-rigid, or rigid foams can be obtained. Suitable polyisocyanates for this purpose include 2,4-tolylene diisocyanate, 2,6-tolylene diisocyanate, 4,4'-diphenylmethane diisocyanate, dianisidine diisocyanate, tolidine diisocyanate, hexamethylene diisocyanate, m-xylylene diisocyanate, 1,5-naphthalene diisocyanate, and other di- and higher polyisocyanates such as those listed in the tables of Siefken, Ann. 562, 122–135 (1959). Preferred polyisocyanates, however, are products obtained by phosgenation of mixtures of methylene-bridged polyphenyl polyamines obtained by the interaction of formaldehyde, hydrochloric acid, and primary aromatic amines, for example, aniline, o-chloroaniline, o-toluidine, or mixtures thereof. Such polyisocyanates are known in the art, e.g., U.S. Patents No. 2,683,730; 2,950,263; and 3,012,008; Canada Patent No. 665,495; and German specification 1,131,877. Particularly preferred polyisocyanates of this type are prepared by phosgenation of methylene-bridged polyphenyl polyamine mixtures containing about 35 to about 90 parts by weight of methylenedianilines, the remainder being triamines and polyamines of higher molecular weight. Of this latter type, especially preferred are polyisocyanates prepared by phosgenation of polyamine mixtures containing about 45 to about 60 parts by weight of methylenedianilines, as more particularly disclosed in Belgian Patent 641,748.

In making polyurethane foams, the above polyisocyanates are reacted with polyol-like material having two or more active hydrogen atoms, for example, polyesters, polyester amides, polyalkylene glycols, polyoxyalkylated glycols, polyoxyalkylated amines as are fully exemplified in the prior art cited. Suitable polyoxyalkylated amines include those having hydroxyl numbers of about 45 to about 700 obtainable from the polyoxyalkylation of butane diamine or the polymethylene polyphenyl amines used to make the polymethylene polyphenyl isocyanates described above. Suitable polyesters are those prepared by conventional methods of condensation polymerization of dibasic acids and/or anhydrides with an excess of diols, triols and/or higher polyols, said polyesters having hydroxyl numbers of about 45 to about 700 and acid numbers from less than 1 to about 10. Dibasic acids and anhydrides include but are not limited to, malonic, succinic, glutaric, adipic, pimelic, suberic, azeleic, sebacic, glutamic, phthalic, isophthalic, and terephthalic acids and succinic and phthalic anhydrides. Diols, triols and higher polyols include, but are not limited to, ethylene glycol, glycerol, trimethylol propane, 1,2,6-hexanetriol, trimethylolethane, penetaerythritol and sorbitol. There may be included cross-linking agents such as glycerol, trimethylol propane, and N,N,N',N'-tetrakis(2-hydroxypropyl) ethylene diamine, also fully exemplified in the prior art cited. There also may be included catalysts such as tertiary amines, for example, N,N,N',N'-tetramethyl-1,3-butane diamine, tetramethylguanidine, 1,4-diazabicyclo(2,2,2)octane and triethylamine. Stannous chloride can also be used. There also may be included cell stabilizers or surfactants of the organo-silicone block copolymer type, for example, a siloxane-alkylene oxide adduct such as marketed under the name DC–113 by the Dow Corning Corporation. The catalysts and surfactants are also fully exemplified in the prior art. There may also be included polyols containing phosphorous in order to impart flame-resisting properties, for example, diethyl N,N-di-(2-hydroxyethyl) aminomethyl phosphonate and like adducts of phosphoric acid and/or polyphosphoric acid, such as pyrophosphoric acid with alkylene oxides such a/s ethylene oxide, propylene oxide, and 1,2-butylene oxide, as well as phosphoric acid polyol polyesters made by other methods. See, for example, U.S. Patents 2,372,244; 3,094,549; 2,830,069; 3,099,676; 3,061,625; and Canadian Patent 560,741. The blowing or foaming can be effected by the addition of water, trichlorofluoromethane, or methylene chloride, and like blowing agents in accordance with the practices well known in the art.

The various components can be metered into the mixer 18 individually or in the form of pre-mixes or pre-polymers according to various techniques already well known in the art.

The traction elements 26 can be formed of polyurethane elastomer or other elastomeric materials, for example, natural and synthetic rubbers. The polyurethane elastomers are particularly advantageous because of their high coefficient of friction with paper. The traction elements 26 are fastened to an endless belt or chain rotating about the axes 86, 88, 90, and 92. The usual sprockets and pressure plates characteristic of endless belt or chain-type tractors or not shown. Suitable hydraulic means, also not shown, is provided for raising and lowering the tractor element 94 and for exerting whatever pressure is necessary to engender the desired amount of traction The upper, and lower traction belts and/or chains are caused to move in unison by a train of gears shown at 96, so designed as not to cause an increase or decrease in pressure on the laminate due to inequalities in the tractive force applied to the top and bottom of the laminate. Mechanism for this purpose comprises an elbow-like chain of gears pivoting about axes 88, 98, and 100.

The top section 39 of the mold is supported by a framework 108 pivoted at 110 to the main frame of the apparatus (not shown) so that the mold can be opened for cleaning or to make it easier to get the sheets 10 and 12 started through the mold.

The invention may now be more fully understood by reference to the following examples in which the parts are by weight unless otherwise specified, and calendered kraft paper is used for sheets 10 and 12 and is pulled through the mold at the rate of about 5 to 7 feet per minute. Rates of .5–10 ft./min. can be used.

Example 1

|  | Parts by Weight |
|---|---|
| (1) Propoxylated glycerine, equivalent weight 465 | 90 |
| (2) N,N,N',N'-tetrakis-(2-hydroxypropyl)ethylenediamine | 10 |
| (3) Triethylene diamine | 0.8 |
| (4) Dimethyl foramide | 6.0 |
| (5) Distilled water | 1.2 |
| (6) Prepolymer prepared by reacting 42 parts of purified castor oil and 8 parts of polyethylene glycol, equivalent weight 100, with 50 parts of toluene diisocyanate at 250° F. for one hour. The equivalent weight then being adjusted to 300 | 100 |

Ingredients 1 through 5 were preblended for convenience. The resulting mixture and ingredient 6 were then metered continuously, as needed, into the mixing chamber 18 in the ratio 108 parts by weight of the preblend to 100 parts by weight of ingredient 6. The resulting semi-rigid polyurethane foam laminate had a somewhat irregular cell structure.

Typical physical properties of the foam core so obtained were:

| Density, lbs./cu. ft. | p.c.f | 8–10 |
|---|---|---|
| Closed cells | percent | 40 |
| Falling ball resiliency | do | 1 |
| Tensile strength | p.s.i. | 44 |
| Elongation | percent | 80 |
| K-Factor |  | 0.30 |

Example 2

|  | Parts by weight |
|---|---|
| (1) Propoxylated polyglycol, equivalent weight 106 | 90 |
| (2) Diethyl N, N-di-(2-hydroxyethyl)aminomethylphosponate | 10 |
| (3) Organo-modified silicone block copolymer surfactant | 1.5 |
| (4) N,N,N',N'-tetramethyl-1,3-butanediamine | 1.0 |
| (5) Trichlorofluoromethane | 32 |
| (6) Polymethylene polyphenylisocyanate with an equivalent weight of 132 | 135 |

Ingredients 1 through 5 were preblended for convenience. The resulting mixture and ingredient 6 were then metered continuously, as needed, into the mixing chamber 18 in the ratio of 134.5 parts by weight of the preblend to 135.0 parts by weight of ingredient 6. The resulting rigid polyurethane foam laminate exhibited a uniformly fine cell structure.

Typical physical properties of the foam core so obtained were:

| Density, lbs./cu. ft. | 2.0–2.3 |
|---|---|
| Compressive strength, p.s.i. | 28–34 |
| Tensile strength, p.s.i. | 30–35 |
| Flame resistance | Non-burning |
| K-Factor | 0.13 |

Example 3

|  | Parts by weight |
|---|---|
| (1) Propoxylated - methyl glucoside, equivalent weight 129 | 100 |
| (2) Organo modified silicone block copolymer surfactant | 1.5 |
| (3) Triethylene diamine | 1.5 |
| (4) Prepolymer prepared by the reaction of 80 parts of toluene diisocyanate with 20 parts of propoxylated sorbitol, equivalent weight 102, with the resulting equivalent weight adjusted to 140 | 114 |
| (5) Trichlorofluoromethane | 40 |

Ingredients 1 through 3 were preblended for convenience. Similarly, ingredients 4 and 5 were preblended. The two blends were then metered continuously, as needed, into the mixing chamber 18 in the ratio of 103 parts by weight of preblend 1–3 to 154 parts by weight of preblend 4–5. The resulting rigid polyurethane foam exhibited a uniformly fine cell structure. Typical physical properties of the foam core so obtained were:

| Density, lbs./cu. ft. | 1.8–2.0 |
|---|---|
| Compressive strength, p.s.i. | 24–30 |
| Tensile strength, p.s.i. | 28–36 |
| K-Factor | 0.13 |

Example 4

|  | Parts by weight |
|---|---|
| (1) Trimethylol propane adipate polyester resin with equivalent weight 95 | 100 |
| (2) Organo modified silicone block copolymer surfactant | 1 |
| (3) N,N,N',N'-tetramethyl-1,3-butanediamine | 0.5 |
| (4) Prepolymer prepared by the reaction of 80 parts toluene diisocyanate with 20 parts of trimethylolpropane adipate, equivalent weight 95, with the resulting equivalent weight being adjusted to 145 | 153 |
| (5) Trichlorofluoromethane | 26 |

Ingredients 1 through 3 were preblended for convenience. Similarly, components 4 and 5 were preblended. The two blends were metered continuously, as needed, into the mixing chamber 18 in the ratio of 101.5 parts preblend 1–3 to 179 parts by weight of preblend 4–5. The resulting rigid polyurethane foam exhibited a uniformly fine cell structure. Typical physical properties of the foam core so obtained were:

| Density, lbs./cu. ft. | 3.0–3.5 |
|---|---|
| Compressive strength, p.s.i. | 60–90 |
| Tensile strength, p.s.i. | 75–110 |
| K-Factor | 0.13 |

Example 5

|  | Parts by weight |
|---|---|
| (1) Propoxylated diethylene triamine, equivalent weight 118 | 100 |
| (2) Organo modified silicone block copolymer surfactant | 1 |
| (3) N,N,N',N'-tetramethyl-1,3-butanediamine | 4 |
| (4) Distilled water | 5.7 |
| (5) Prepolymer prepared by the reaction of 80 parts of toluene diisocyanate with 20 parts of propoxylated sorbitol, equivalent weight 102, and the resulting equivalent weight adjusted to 140 | 210 |

The ingredients 1 through 4 were preblended for convenience. The resulting mixture and ingredient 5 were then metered continuously, as needed, into the mixing chamber of the foam machine in the ratio of 134.5 parts by weight of the preblend to 135.0 parts by weight of ingredient 5. The resulting rigid polyurethane foam exhibited a uniformly fine cell structure. Typical physical properties for the foam core so obtained were:

| | |
|---|---|
| Density, lbs./cu. ft. | 1.6–1.9 |
| Compressive strength, p.s.i. | 20–25 |
| Tensile strength, p.s.i. | 24–30 |
| K-Factor | 0.23 |

*Example 6*

| | Parts by weight |
|---|---|
| (1) Propoxylated glycerine, equivalent weight 1000 | 100 |
| (2) Triethylene diamine | 0.15 |
| (3) Trichlorofluoromethane | 8.0 |
| (4) Distilled water | 4.0 |
| (5) Stannous octoate | 0.35 |
| (6) Toluene diisocyanate | 52 |
| (7) Organo-modified silicone block copolymer surfactant | 0.8 |

Ingredients 1 through 4 were preblended. Ingredients 6 and 7 were also preblended. The two blends plus ingredient 5 were then metered continuously, as needed, into the mixing chamber 18 in the ratio 112.15 parts of blended ingredients 1–4, 0.35 part of ingredient 5 and 52.8 parts of blended ingredients 6 and 7. The resulting flexible polyurethane foam had a fine, uniform cell structure. Typical physical properties of the foam core so obtained were:

| | |
|---|---|
| Density, lbs./cu. ft. | 1.7 |
| RMA deflection, 50 sq. in. | lb 38 |
| ASTM Compression set (50%) | percent 6 |
| Tensile strength | p.s.i. 15 |
| Elongation | percent 175 |
| Resiliency | do 35 |

The invention is particularly useful in forming foam-cored laminates of semi-rigid and rigid polyurethane foams, as more particularly illustrated in the foregoing examples. It is nonetheless useful for producing foam-cored laminates of flexible foams. For example, when toluene diisocyanate and the prepolymer of U.S. Patent 3,056,168 are metered into the mixing chamber 18 in the proportions to a level of free isocyanate at about 9.5%, a flexible foam core is obtained which in passage through the traction zone is crushed to break down a portion of the cells to decrease rigidity. The product can then be further cured by heating at a temperature of approximately 250–300° F. for about 1 hour. If desired, the crushing of the flexible foam can be avoided by applying traction only to the portions of the sheet as shown at 104 and 106 which extends beyond the foam core.

I claim:

1. A process for producing continuously an elongated foam-cored laminate of uniform segmental cross section with complementary tongue and groove fitments whereby the segments can be fitted together to form a pipe cover, which comprises continuously disposing top and bottom sheets of flexible and substantially non-stretchable, initially flat, material longitudinally between superposed top and botom sections of an elongated, horizontally disposed, mold of uniform segmental cross-section with complementary tongue and groove fitments in said top section, distorting the bottom said sheet to conform it to the inner surface of the bottom of said mold and the top said sheet to conform it to the inner surface of the top of said mold including said tongue and groove fitments whereby all of the inner surface of said mold is lined with said material, depositing a polymer-forming liquid mixture on said bottom sheet, said mixture being of the type which can be caused to polymerize simultaneously with the generation of gas thereby giving rise to a self-supporting cellular structure having resistance to compression, causing said mixture to polymerize with foaming to rise and fill said mold and contact said sheets therein without substantial displacement thereof, passing the resulting self-supporting foam-cored laminate through a curing zone, and contacting the outer surface of said laminate after passage through said curing zone with opposed, rectilinear, traction surfaces so moving as to provide sufficient pulling force to pull said laminate as formed through said mold and then through said curing zone at a rate such that the rising foam contacts said top sheet before passing through said curing zone, said traction surfaces being aligned with the mold so as not to bend said laminate, and having sufficient area and surface characteristics so that the necessary pulling force is generated without deleteriously compressing the foam core.

2. Apparatus for continuous casting of foam-cored laminates comprising an elongated, tubular mold composed of top and bottom sections and having a substantially uniform cross section throughout its length, said bottom section being channel-shaped and provided with outstanding shoulders at the top thereof and said top section being of complementary shape and provided with outstanding shoulders adapted to rest in apposition to the first-named said shoulders, the one of the shoulders of said top section being provided with a downwardly projecting longituidnal rib and the other thereof being provided with a complementary upwardly extending longitudinal channel; means for passing top and bottom, initially flat, sheet material through said mold with portions of each sheet on each side being deposed between said shoulders; means for distorting said sheet material to conform it to the bottom section of the mold; means for distorting said sheet material to conform it to the top section of said mold in surface contact with all the surfaces thereof including said longitudinal rib and said longitudinal channel; means for feeding a foam-forming liquid so that it is carried into said mold; and means for applying traction to said sheet material to extract the foam-cored laminate from said mold and to pull said sheet material thereinto and therethrough.

3. The apparatus of claim 2 in which the means for distorting the sheet material to conform it to the top section of the mold comprises longitudinally extending fingers arranged to conform the sheet material to the longitudinal rib and the longitudinal channel.

4. Apparatus for extracting a foam-cored laminate from a continuous molding machine which comprises a plurality of elastomeric tractor elements disposed to engage one side of said laminate after the laminate leaves said molding machine, a like number of elastomeric tractor elements disposed to engage the opposite side of said laminate and arranged to move in unison with said first named tractor elements, means for causing said tractor elements firmly to engage the opposite sides of said laminate, and means for causing said tractor elements to move away from said molding machine.

5. The apparatus of claim 3 in which the elastomeric tractor elements are of elastomeric polyurethane.

References Cited

UNITED STATES PATENTS

| | | | |
|---|---|---|---|
| 775,540 | 11/1904 | McConnell | 25—99 |
| 2,872,965 | 2/1959 | Sisson | 264—47 |
| 2,993,871 | 7/1961 | Shannon et al. | 264—47 |
| 3,078,505 | 2/1963 | Matten | 18—4 |
| 3,095,337 | 6/1963 | Chase | 264 |
| 3,217,070 | 11/1965 | Stewart | 264—27 |
| 2,898,626 | 8/1959 | Alderfer et al. | 264—47 XR |
| 3,118,800 | 1/1964 | Snelling | 264—47 XR |
| 3,166,454 | 1/1965 | Voelker | 264—47 XR |
| 3,296,658 | 1/1967 | Buff et al. | 18—40 |

FOREIGN PATENTS 842,267   9/1952   Germany.

(Other references on following page)

FOREIGN PATENTS 610,074 3/1956 Germany.
965,185 7/1964 Great Britain.

OTHER REFERENCES

Healy, T. T., Polyurethane Foams; London, Iliffe Books, 1964, pp. 141–144. Tp. 1180, P659 1963.

PHILIP E. ANDERSON, Primary Examiner.

U.S. Cl. X.R.

18—4, 5, 19; 260—2.5; 264—263, 266; 161—149; 138—149